UNITED STATES PATENT OFFICE.

HENRY SELLMANN, OF HOBOKEN, NEW JERSEY, AND HERMAN REESSING AND JULIUS WOLFF, OF NEW YORK, N. Y.

IMPROVEMENT IN COMPOUNDS FOR PRESERVING FISH.

Specification forming part of Letters Patent No. 166,308, dated August 3, 1875; application filed June 19, 1875.

*To all whom it may concern:*

Be it known that we, HENRY SELLMANN, of Hoboken, in the county of Hudson and State of New Jersey, and HERMAN REESSING and JULIUS WOLFF, of the city, county, and State of New York, have invented a new and useful Improvement in Preparing Fish caught in American waters, of which the following is a specification:

The object of this invention is to furnish an improved mode of preparing fish caught in American waters, to take the place of the imported sardines, and which shall be a better article.

The invention will first be fully described, and then pointed out in claim.

The fish are caught in nets, and are thrown, while still alive, into strong brine contained in suitable casks on board the fishing-vessels. This part of the process is important, as it not only kills the fish but prevents them from spoiling while being cleaned and cured. The fish are kept in this brine for at least ten days. The fish are then taken from the brine, and are beheaded, gutted, and scaled. They are then thoroughly cleansed in clear, cold water, and are placed in large willow baskets, or in sieves, to allow the water to drain and dry off. The fish, after draining for five or six hours, are emptied and spread upon the packing-tables, and are assorted as to their size, each size being packed by themselves. The fish are preserved and at the same time flavored by being packed with the following ingredients. We will give the amounts of the ingredients used for packing one hundred and twenty pounds of fish: Two gallons of vinegar; one and a half pound of allspice; two ounces of red pepper; four pounds of sliced onions; two pounds of sliced horseradish; one pound of bay-leaves; one-half pound of cloves; one-half pound of ginger; one-half pound of coriander-seed; one-quarter of a pound of Chili pepper, and two and a half ounces of capers.

In packing the fish a small quantity of the vinegar and a thin layer of the other ingredients are placed in the bottom of the vessel, and a layer of fish, placed back upward, are put in, and gently pressed down. Another small quantity of vinegar and thin layer of the other ingredients are then put in and another layer of fish, and so on until the vessel is full.

The fish are ready for market and consumption in about four days in summer, and in from three to four weeks in winter.

Having thus described our invention, we claim as new and desire to secure by Letters Patent—

A compound of vinegar, allspice, pepper, onions, horseradish, bay-leaves, cloves, ginger, coriander-seed, Chili pepper, and capers, in about the proportions specified.

HENRY SELLMANN.
HERMAN REESSING.
JULIUS WOLFF.

Witnesses:
JAMES T. GRAHAM,
T. B. MOSHER.